(12) United States Patent
Smalley et al.

(10) Patent No.: US 12,066,367 B2
(45) Date of Patent: Aug. 20, 2024

(54) ELECTROMAGNETIC TRAP MULTIPLEXING

(71) Applicant: Brigham Young University, Provo, UT (US)

(72) Inventors: Daniel Smalley, Provo, UT (US); Braden Huffman, Provo, UT (US); Stephen Griffith, Provo, UT (US)

( * ) Notice: Subject to any disclaimer, the term of this patent is extended or adjusted under 35 U.S.C. 154(b) by 610 days.

(21) Appl. No.: 17/202,341

(22) Filed: Mar. 15, 2021

(65) Prior Publication Data

US 2021/0310924 A1 Oct. 7, 2021

Related U.S. Application Data

(60) Provisional application No. 62/989,523, filed on Mar. 13, 2020.

(51) Int. Cl.
*G01N 15/0205* (2024.01)
*B25J 7/00* (2006.01)

(52) U.S. Cl.
CPC ............ *G01N 15/0205* (2013.01); *B25J 7/00* (2013.01); *G01N 2015/025* (2013.01)

(58) Field of Classification Search
CPC ......... G01N 15/0205; G01N 2015/025; G21K 1/006; G21K 1/003; B25J 7/00
See application file for complete search history.

(56) References Cited

U.S. PATENT DOCUMENTS 9,086,429 B1 * 7/2015 Biedermann .......... G01C 19/62

FOREIGN PATENT DOCUMENTS

| CN | 102116882 A | * | 7/2011 | |
|---|---|---|---|---|
| CN | 102540447 A | * | 7/2012 | |
| JP | 2013235122 A | * | 11/2013 | |
| WO | WO-2007072258 A2 | * | 6/2007 | ............. G02B 21/32 |

* cited by examiner

*Primary Examiner* — David E Smith
(74) *Attorney, Agent, or Firm* — Shapiro IP Law; Joseph Shapiro

(57) ABSTRACT

Time multiplexing an electromagnetic trap beam may be used to generate trap shapes/geometries to trap one or more particles with one electromagnetic beam by directing the electromagnetic beam at a pattern of different locations with sufficient rapidity to form an effective shape/geometry. Additionally, multiplexing an electromagnetic trap beam may be used to shutter trapping electromagnetic radiation to protect a viewer, use the same beam for multiple functions, move and organize particles, and generate illumination effects.

8 Claims, 22 Drawing Sheets

$t_1$ $t_2$ $t_3$ $t_4$ $t_5$ $t_6$

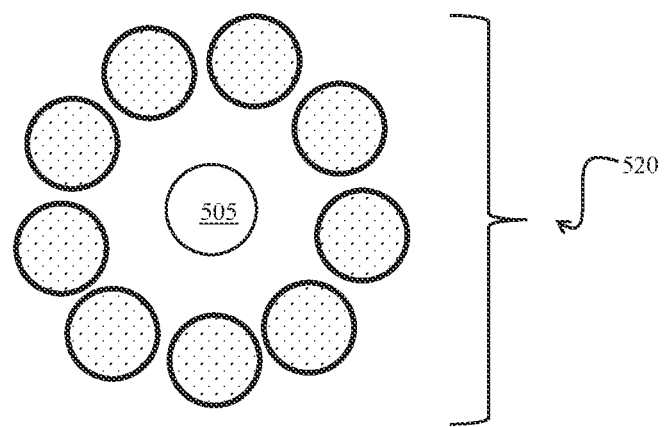
FIG. 5a
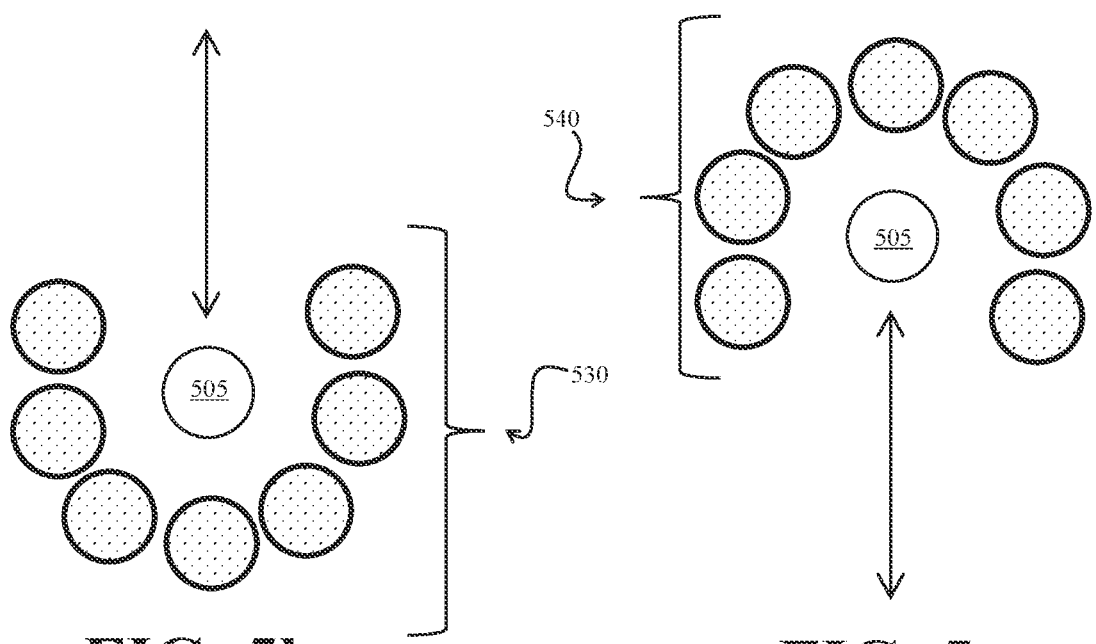
FIG. 5b
FIG. 5c

ELECTROMAGNETIC TRAP MULTIPLEXING

BACKGROUND OF THE INVENTION

Recent advances in the field of electromagnetic trapping (sometimes referred to loosely at "optical trapping"), e.g., optical trap displays, have resulted in the ability to trap a particle in 3D space using an electromagnetic beam. This application incorporates by references, as background material, at least the following: U.S. patent application Ser. No. 16/255,642 (Smalley, "Optical Trap 3D Printing," filed Jan. 23, 2019).

As used herein, "optical beam" or "beam" may generally refer to electromagnetic radiation from a light source, or laser, or any other source of electromagnetic radiation known in the art. These advances include the use of various optical and/or electrical apparatuses and approaches to generate different beam shapes, i.e., different 3D geometries and/or boundaries for a particle trap. These approaches suffer, however, from at least several shortcomings. First, each new trap geometry requires a new and custom-designed optical and/or electrical apparatus to generate the particular geometry. Arbitrary geometries cannot be generated. Second, if a secondary operation is desired to be performed on a trapped particle (e.g., illumination, curing for 3D printing or other application(s), or alteration of the particle), additional beam(s) are needed for the additional function(s). What is needed is a system and method to improve on these shortcomings.

For particle trapping using electromagnetic beams, research to-date has focused on apparatuses and other means (e.g., optics, etc.) for generating electromagnetic beams having particular shapes or other characteristics. This approach suffers from at least two significant shortcomings: First, each different shape, and even variant or modification of the same shape, requires a different apparatus, or modification to an apparatus, to generate the desired shape, and may further require a different beam source and/or adjustments to a beam source. In addition to limiting the beam shapes that can be generated, this approach also limits the speed at which beam shapes can be changed. Second, additional electromagnetic beams are necessary (in addition to the trapping beam for illuminating, rotating, curing, or otherwise manipulating a particle while a trapping beam keeps the particle in a desired location.

What is needed is a system and method that overcomes, in whole or in part, some or all of these shortcomings.

BRIEF SUMMARY OF THE INVENTION

Using a time-multiplexed approach, electromagnetic trapping beams may be used to generate complex particle trapping geometries by directing the trapping beam at different locations at different time slots. In this manner, particles may be trapped, moved, organized, probabilistically trapped, illuminated, and cured using only one or very few electromagnetic beams.

BRIEF DESCRIPTION OF THE DRAWINGS

FIGS. 5a-5c shows an exemplary use of time multiplexing to generate a trap geometry that opens and closes.

DETAILED DESCRIPTION OF THE INVENTION

Figure 1A:
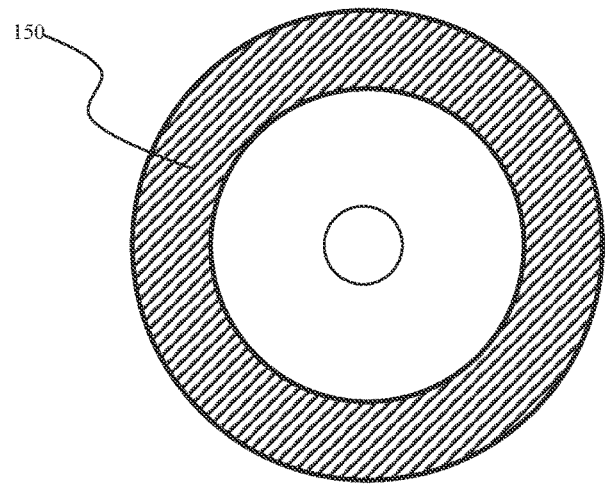
FIG. 1a (prior art) shows the cross section of a ring beam shape formed by using an axicon.

This Application claims priority to U.S. Provisional Application No. 62/989,523, which is incorporated herein by reference in its entirety, filed on Mar. 13, 2020, the first inventor of which is Daniel Smalley, and which is titled "Multiplexing for Optical Trap Displays."

An improved system and method for multiplexing optical trap displays and applications of such are disclosed.

Table of Reference Numbers from Drawings:

The following table is for convenience only, and should not be construed to supersede any potentially inconsistent disclosure herein.

| Reference Number | Description |
| --- | --- |
| 101 | location |
| 102 | location |
| 103 | location |

-continued

| Reference Number | Description |
|---|---|
| 104 | location |
| 105 | location |
| 106 | location |
| 107 | location |
| 108 | location |
| 109 | location |
| 110 | location |
| 111 | location |
| 112 | location |
| 113 | location |
| 150 | Cross section of ring-shaped beam |
| 170 | Continuous path for trapping beam |
| 175 | Beam tip |
| 177 | particle |
| 205 | particle |
| 210 | beam |
| 211 | location |
| 212 | location |
| 213 | location |
| 214 | location |
| 215 | location |
| 216 | location |
| 217 | location |
| 218 | location |
| 310 | Ring-shaped beam |
| 321 | Ring-shaped trap section |
| 322 | Ring-shaped trap section |
| 323 | Ring-shaped trap section |
| 324 | Ring-shaped trap section |
| 325 | Ring-shaped trap section |
| 330 | Beam source |
| 341 | Cross section of ring-shaped beam |
| 342 | Cross section of ring-shaped beam |
| 343 | Cross section of ring-shaped beam |
| 344 | Cross section of ring-shaped beam |
| 345 | Cross section of ring-shaped beam |
| 410a-d | particles |
| 505 | particle |
| 520 | Trap |
| 530 | Trap |
| 540 | trap |
| 610 | Particle |
| 620 | Space |
| 710 | particle |
| 720 | beam |
| 730 | location |
| 740 | Location |
| 750 | Reflected light |
| 760 | Reflected light |
| 810 | Particle |
| 820 | Beam |
| 822 | beam |
| 830 | Location |
| 840 | Location |
| 850 | Reflected light |
| 860 | Reflected light |
| 910 | particle |
| 920 | Beam |
| 922 | Beam |
| 924 | beam |
| 930 | Location |
| 932 | Location |
| 934 | Location |
| 950 | Reflected light |
| 952 | Reflected light |
| 1010 | Beam |
| 1011 | Beam after passing through on/off cycling device |
| 1020 | On/off cycling device |
| 1030 | Optics device |
| 1040 | trap location |
| 1050 | detector |
| 1060 | On/off time signature for on/off cycling device 1020 |
| 1070 | On/off time signature for detector 1050 |
| 1110 | Shutter |
| 1111 | Non-blocking portion of shutter |
| 1112 | Blocking portion of shutter |
| 1115 | Shutter |
| 1116 | Non-blocking portion of shutter |
| 1117 | Blocking portion of shutter |
| 1120 | Trap ER |
| 1130 | Illumination ER |
| 1140 | Trap/particle location |
| 1150 | Eye/detector/receiver |
| 1210 | Trap beam |
| 1220 | Illumination beam |
| 1230 | particle |
| 1240 | Eye/detector/viewer |
| 1250 | Shutter |
| 1252 | Blocking portion of shutter |
| 1254 | Non-blocking portion of shutter |
| 1310 | Beam sources |
| 1320 | Optical device |
| 1322 | beam |
| 1324 | Beam |
| 1326 | Beam |
| 1328 | Beam |
| 1330 | Beam |
| 1332 | beam |
| 1350 | particle |
| 1360 | Spatial filter |
| 1370 | Eye/viewer/receiver/detector |
| 1372 | Eye/viewer/receiver/detector |
| 1410 | Acoustic-optic modulator |
| 1420 | Beam |
| 1710 | Illumination light region |
| 1712 | Illumination light region |
| 1714 | Illumination light region |
| 1716 | Illumination light region |
| 1720 | Trapped particle |

"ER" is used herein below as an abbreviation for "electromagnetic radiation."

In the disclosure herein below, "eye," "detector," and "receiver" are used interchangeably to refer to a device and/or human eye for receiving, perceiving, and/or detecting electromagnetic radiation.

Trapped Particles

A particle that is susceptible to trapping may be any phase: solid, liquid (e.g., a droplet), gas, plasma, or hybrid (e.g., a solid capsule holding a liquid such as a medicine or a poison).

In some embodiments, a particle may be a complete and complex object such as a microchip, MEMs device or a diode laser that is held and placed in an assembly like an optical "pick and place," and additional particles could be used to connect that object physically and/or electrically to a surrounding structure. In some embodiments, one or more illumination beams could be used to activate the device during printing. As used herein, "illumination" does not require visibility to the human eye or any other segment of the electromagnetic spectrum, but may refer to any segment of the electromagnetic spectrum having desirable properties for a specific application or conditions.

The medium in which a particle may be trapped may be a liquid, air, water, freespace, or any other medium in which a particle may exist.

Time Multiplexing to Separate Beam Functions

Figure 10:
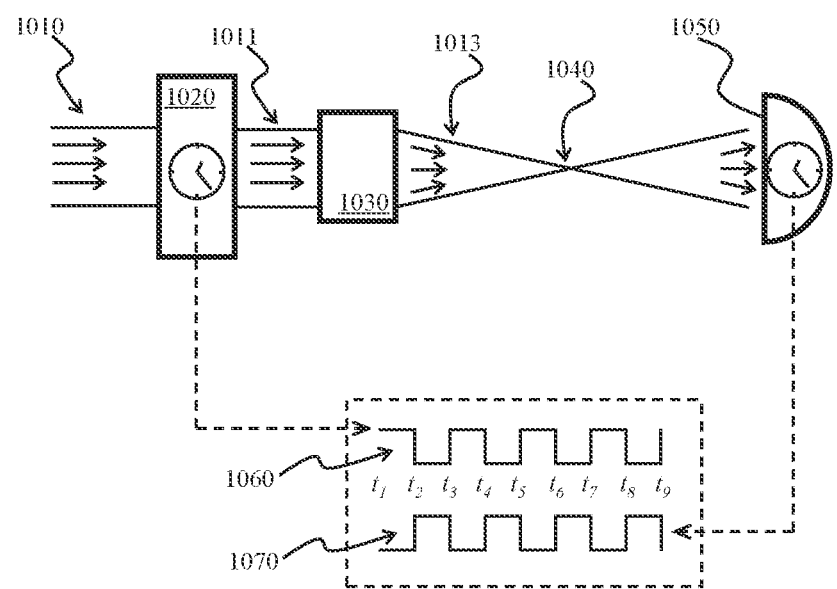
FIG. 10 shows an exemplary embodiment for using time multiplexing to separate beam functions.

FIG. 10 shows an exemplary embodiment for using time multiplexing to separate beam functions in applications for optical trap displays, optical trap 3D printing, hybrid applications, and other applications relating to optical/electromagnetic trapping and/or generating a 3D geometry using optical/electromagnetic trap technologies and/or optical/electromagnetic beams.

As shown in FIG. 10, beam 1010 may enter on/off cycling device 1020. On/off cycling 1020 device may be mechanical, electrical, optical, or any other implementation known in the art. On/off cycling device 1020 may be a chopper or gating apparatus. On/off cycling device 1020 may have an adjustable frequency, e.g., the speed at which it cycles between on and off. The "on" state allows light or other electromagnetic radiation to pass through. The "off" state blocks light and/or electromagnetic radiation. For example, in the "on" state, beam 1010 will pass through on/off cycling device, emerging as beam 1011. In the "off" state, beam 1010 will not pass through on/off cycling device 1020 and will not emerge.

Optics device 1030 may be any component, apparatus, or set of such designed to generate a trap for a particle, or to otherwise generate an output beam with modified characteristics (relative to the input beam). Optical/electromagnetic trapping is known in the art and devices for generating such a beam are well known. As shown in FIG. 10, input beam 1011 may pass through trap optics device 1030 and emerge as trapping beam 1013, which may generate a trap at location 1040. Detector 1050 may be any device for detecting electromagnetic radiation, e.g., a camera or any other such device known in the art. Detector 1050 may also have on/off functionality, or on/off cycling functionality, so that detector 1050 is not always detecting, but is detecting only when on. In one embodiment, the respective timing of on/off cycling device 1020 and detector 1050 may be coordinated so that on/off device 1020 alternates between an on and off state according to a pattern and/or at some frequency, and detector 1050 is off when on/off cycling device is on, so that detector 1050 does not detect the light or electromagnetic radiation from on/off cycling device for the purpose of trapping a particle or for any other functionality for which it would be undesirable for detector to detect such beam. Detector 1050 may be in an "on" state when on/off cycling device 1020 is off, so that detector 1050 may detect other radiation, e.g., illumination, when on/off cycling device is off.

In one embodiment, on/off cycling device 1020 and detector 1050 may have the on/off time signatures 1060 and 1070 in FIG. 10, such that, e.g., at time $t_1$ on/off cycling device 1020 is on and detector 1050 is off, at time $t_2$ on/off cycling 1020 device is off and detector 1050 is on, and etc. as shown in FIG. 10. Any on/off pattern may be used. In one embodiment, an illumination beam may be directed to trap location 1040 when on/off cycling device is off.

Figure 11A:
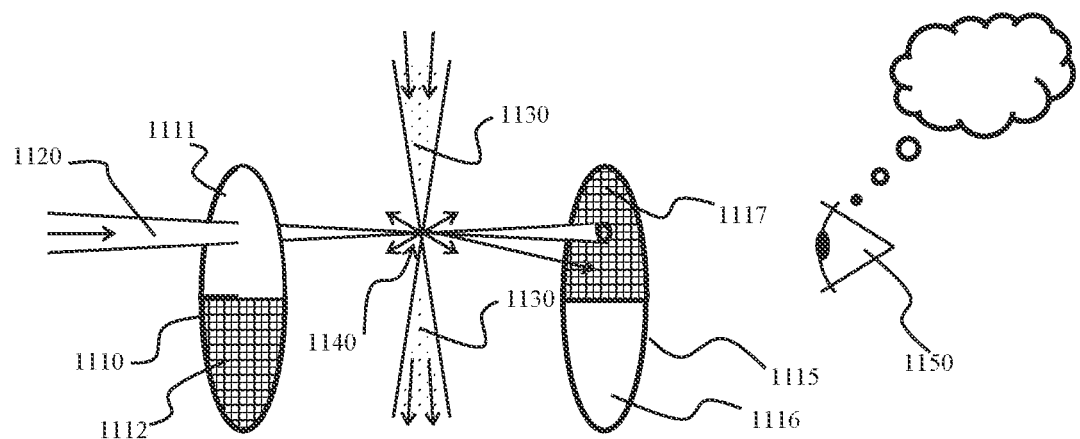
FIGS. 11a-b show how a shutter may be used to block undesirable time-multiplexed trap light from an eye, detector, or other receiver.
Figure 11B:
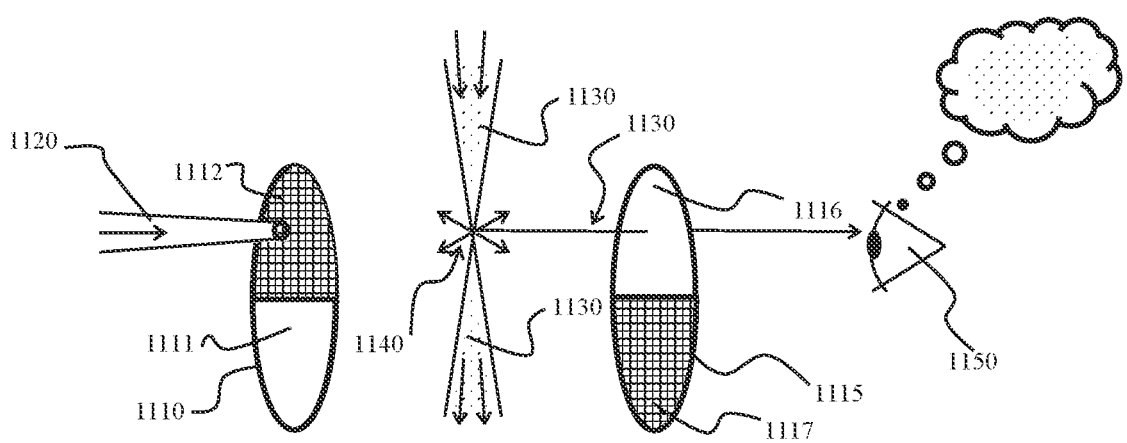

FIGS. 11a and 11b show how a shutter may be used to block undesirable time-multiplexed trap light from an eye, detector, or other receiver. As shown in FIG. 11a, shutter 1110 and shutter 1115 each have two parts: one portion, 1111 and 1116 (blank/white) allows light to pass, and the other portion, 1112 and 1117 (shaded/hatched) blocks light. In FIG. 11a, first shutter 1110 is configured to allow trap ER 1120 to pass and second shutter 1115 is configured to block ER. When trap ER beam 1120 passes through non-blocking portion 1111 of first shutter 1110 it is able to generate a trap at location 1140, but the trap light/beam is unable to pass through blocking portion 1117 of shutter 1115 and therefore does not reach eye/detector/receiver 1150, which perceives a blank (or nothing). Illumination ER beam 1130 reflects a particle at location 1140 trapped at location 1140 of trap, but is not perceived at eye/receiver 1150 because it is blocked by blocking portion 1117 of second shutter 1115.

FIG. 11b shows a configuration that blocks the trap ER beam and allows the illumination ER to pass to eye/receiver 1150. In FIG. 11b, first shutter 1110 and second shutter 1115 have been reoriented, or flipped, so that blocking portion 1112 of first shutter 1110 blocks trap ER beam 1120, which is unable to reach trap location 1140. Illumination ER beam 1130 reflects off the particle trapped at location 1140, and is perceived by eye/receiver 1150 because it passes through non-blocking portion 1116 of second shutter 1115 to reach eye/receiver 1150. In this manner, using a time multiplexing scheme, at some times trap ER beam reaches trap location 1140 (location of the particle) and is able to trap the particle (or to generate part of a trap) and during those times ER from the trapping beam may be blocked from reaching a human eye or other receiver/detector device. At other times trap ER beam is blocked from reaching the particle for trapping and illumination ER is allowed to reflect off the particle and pass through the second shutter to reach a human eye or other receiving/detecting device. Many variations are within the scope of this disclosure and may be used to trap a particle by time multiplexing and to allow for other functions (e.g., illumination, curing) to be performed on the trapped particle.

Because a trapping ER beam may be time multiplexed very fast, especially relative to the spatial velocity of a trapped particle, it is not necessary to continuously maintain a trap or every portion of the trap, and it is possible to generate a trap geometry resulting from directing a trapping beam at multiple locations or along a path/pattern that generates a trap, and/or to perform other functions or operations during time slots not used for trapping.

Gates, shutters, blocks, or other blocking mechanisms disclosed herein could be implemented additionally with filters.

In one embodiment, a color filter may be used to block trap light from reaching a viewer/detector, but to allow desirable light to reach a viewer/detector. Such a color filter may be used, for example, in a situation where it is undesirable for a viewer/detector to be exposed to trapping electromagnetic radiation, but desirable for illumination light to reach a viewer/detector.

Temporal Multiplexing to Generate a Trap

In one embodiment, temporal multiplexing allows for drawing/creating/generating an arbitrarily shaped 3D particle trap using electromagnetic beams. For the sake of clarification, a 3D multiplex-generated "shape" may have applications other than particle trapping, but particle trapping is used as an exemplary application in the discussion herein. "Shape and geometry" are used interchangeably. "Draw," "create," and "generate" are used interchangeably relative to generating a trap or geometry, or part of a trap or geometry.

Because a particle in a medium may move much more slowly than it is possible to point a beam point at multiple locations, it is possible to trap or otherwise manipulate the particle by quickly and successively "drawing" a trap by pointing the beam point at multiple locations that together effectively act as a trap.

For example, FIG. 1a (prior art) shows the cross section of a ring beam shape formed, as known in the art, by using an axicon.

Figure 1B:
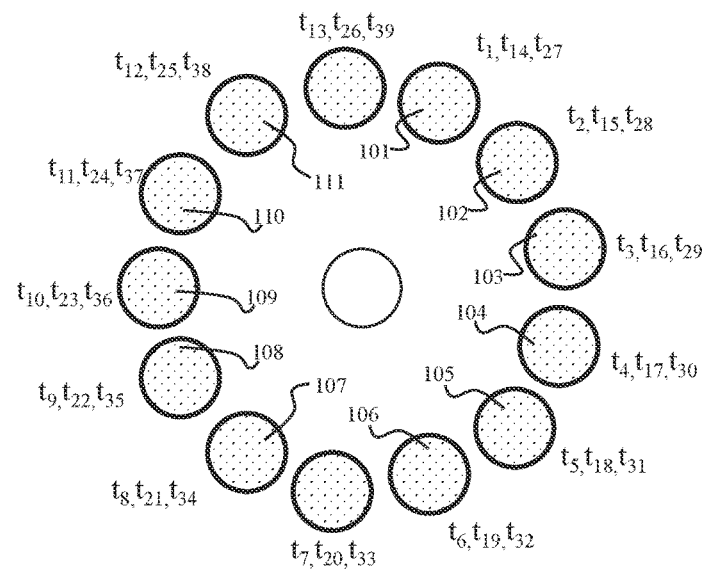
FIG. 1b illustrates a functional ring shape/geometry generated by successively directing a trapping beam at different locations at different times.

A functionally identical (at least for the purposes of particle trapping and other applications) trap may be generated by, as shown in FIG. 1b, by successively and iteratively directing a trapping beam at the locations/times as shown in FIG. 1b:

| Time | Beam Point Location |
|---|---|
| $t_1, t_{14}, t_{27}$ | 101 |
| $t_2, t_{15}, t_{28}$ | 102 |
| $t_3, t_{16}, t_{29}$ | 103 |
| $t_4, t_{17}, t_{30}$ | 104 |
| $t_5, t_{18}, t_{31}$ | 105 |
| $t_6, t_{19}, t_{32}$ | 106 |
| $t_7, t_{20}, t_{33}$ | 107 |
| $t_8, t_{21}, t_{34}$ | 108 |
| $t_9, t_{22}, t_{35}$ | 109 |
| $t_{10}, t_{23}, t_{36}$ | 110 |
| $t_{11}, t_{24}, t_{37}$ | 111 |
| $t_{12}, t_{25}, t_{38}$ | 112 |
| $t_{13}, t_{26}, t_{39}$ | 113 |

Figure 1C:
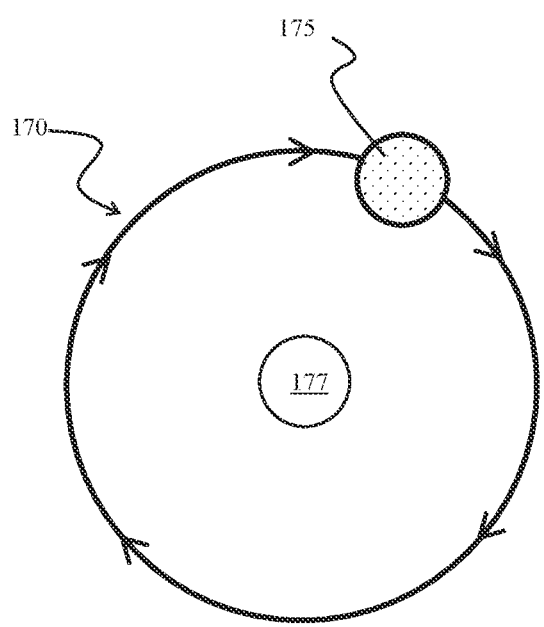
FIG. 1c illustrates a continuous path that a beam tip may repeatedly follow to generate a shape/geometry or trap.
Figure 2A:
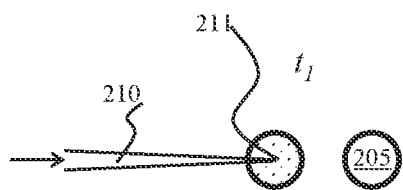
FIGS. 2a-2l show an exemplary embodiment in which the same beam could be time-multiplexed to both trap and illuminate a particle.
Figure 2B:
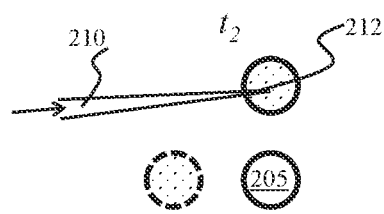
Figure 2C:
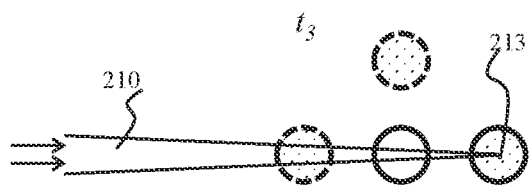
Figure 2D:
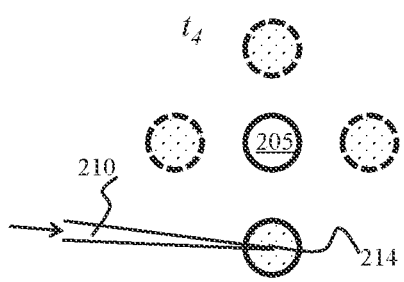
Figure 2E:
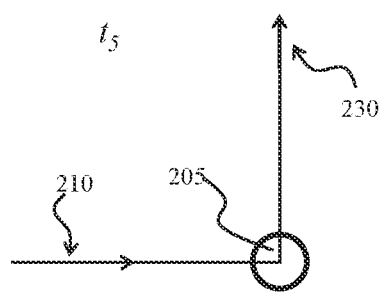
Figure 2F:
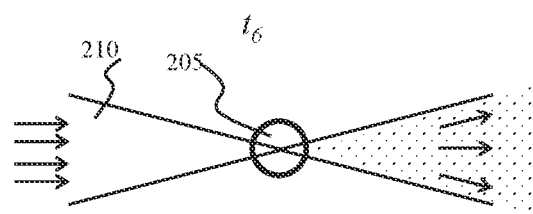
Figure 2G:
Figure 2H:
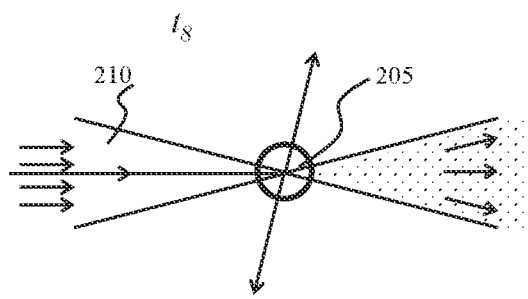
Figure 2I:
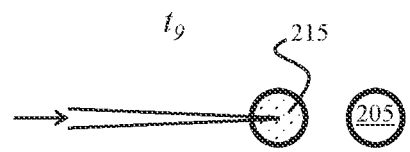
Figure 2J:
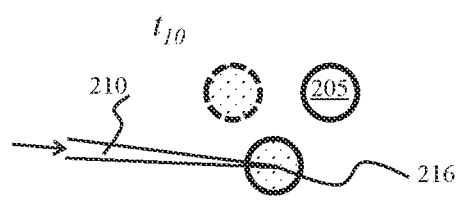
Figure 2K:
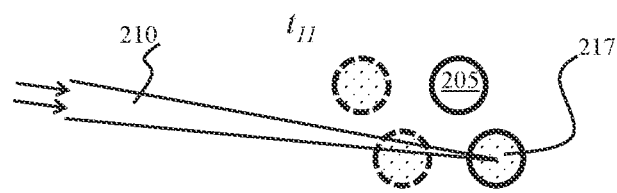
Figure 2L:
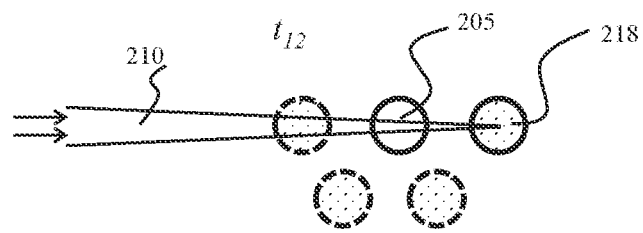

In another embodiment, instead of using iterative or pulsed beams, a beam tip 175 may follow a continuous path 170 to generate a shape or trap. FIG. 1c shows a continuous path 170 that a beam tip 175 may repeatedly follow to generate a shape or trap, e.g., around particle 177.

As used herein, "trap tip" or "trap beam tip" refers to the segment of a trapping beam that is used for generating a trap or trap section. The trap tip of a trapping beam may be a focused point or segment of the trapping beam, or a shaped segment of the trapping beam, or any other segment of a trapping beam that, when placed on a point or piece of space, results in trapping characteristics.

Several options are available for directing a trap beam tip to different locations or to move a trap beam tip continuously along a path or pattern.

Am acousto-optic modulator may be used to direct a beam in an x-y plane. A acousto-optic modulator uses diffraction and acoustic waves (created using piezo electric effect) to accurately and precisely scan the x-y plane very quickly (e.g., 4000 m/s).

For adjusting beam tip location along the z axis, a piezo may be used. Other options for the z axis include a third acousto-optic modulator, or time illumination for the z axis, or a varifocal mirror device (change curvature of mirror) for the z axis.

As known in the art, a beam tip may be moved using the tip of fiber and a piezo drier, or by using flying fiber.

Although FIGS. 1b and 1c show a 2D path or pattern that a beam may follow to generate a shape or trap, a similar approach may be applied to three dimensions by selecting a set of locations that will result in a functional trap if the beam tip is iteratively pulsed through such set of locations, or a by selecting a pattern or path that a beam may follow continuously or partially continuously to generate a shape and/or functional trap.

A beam pulsing pattern or continuous (or partially continuous) path/pattern to generate a shape/trap may comprise ensuring that the beam tip appears at a particular location or in a particular region with sufficient frequency that it is highly unlikely for trapped or target particle to travel toward or past the location without being obstructed by the trap/boundary formed at that location or region by the periodic appearance of the beam tip.

One of the benefits of this approach is the ability to generate arbitrary shapes (e.g., arbitrarily-shaped traps or arbitrarily-shaped geometries).

The beam tip used to generate a trap may be a tightly focused spot, or it could have another shape (e.g., ring, variable ring). Using multiplexing as described herein, scanning the beam tip shape (e.g., tightly focused spot or other shape) iteratively over a path or pattern, or pulsing, may allow for generation of a trap geometry.

Time Multiplexing for Multiple Beam Functions

Time multiplexing may be used to achieve multiple beam functions from the same beam. For example, instead of using a first beam for trapping and a second beam for illuminating (e.g., display) or curing (e.g., optical trap 3D printing), the same beam could be time-multiplexed to perform multiple functions during different time slots.

For example, as shown in FIGS. 2a-2l, the same beam could be time multiplexed to both trap and illuminate a particle. FIGS. 2a-2l show a particle 205 at times $t_1$-$t_{12}$. At time $t_1$ (FIG. 2a), beam 210 is a trapping beam directed at location 211. At time $t_2$ (FIG. 2b), beam 210 is a trapping beam directed at location 212. At time $t_3$ (FIG. 2c), beam 210 is a trapping beam directed at location 213. At time $t_4$ (FIG. 2d), beam 210 is a trapping beam directed at location 214. By directing beam 210 at locations 211, 212, 213, and 214 at times $t_1$-$t_4$ (while configured as a trapping beam), a trap may be generated. At times $t_5$-$t_8$, beam 210 may be repurposed as an illumination beam. At time $t_5$ (FIG. 2e), beam 210 may as a result of its interaction with particle 205, be redirected in direction 230. At time $t_6$ (FIG. 2f), beam 210 may be a beam that, as a result of its interaction with particle 205, reflects color at an angular spread. At time $t_7$ (FIG. 2g) there may be no illumination or other type of beam.

At time $t_8$ (FIG. 2h), beam 210 may be a beam that, as a result of its interaction with particle 205 reflects a mix of colors and spreads at an angular spread.

At times $t_9$-$t_{12}$, (FIGS. 2i-2l) beam 210 may be used again for generating a trapping shape or geometry. At $t_9$ (FIG. 2i), beam 210 is a trapping beam directed at location 215. At $t_{10}$, beam 210 is a trapping beam directed at location 216. At $t_{11}$, beam 210 is a trapping beam directed at location 217. At $t_{12}$, beam 210 is a trapping beam directed at location 218. By rapidly directing beam 210 at locations 215, 216, 217, and 218, a functional trapping shape is formed to trap (or partially trap) particle 205.

By time multiplexing, the same beam may be used for generating a functional trap, illuminating in one or more colors, and illuminating in different directions and spreads. In general, because the characteristics of the illumination beam (width, focus, color, etc.) may be changed much more quickly that the human eye can perceive, time multiplexing allows for accomplishing with one beam illumination and other conditions that would require multiple beams without illumination. The only hard physical limitation on this approach is the time resolution of the human eye and the speed at which a beam may be adjusted and/or scanned.

A beam used for time multiplexing may be solid or hollow. One benefit of a hollow beam is that the beam may be able to generate a portion of a trap on the far side of a particle without being obstructed by the particle. Additionally, another benefit of a hollow beam is the ability to more tightly focus in the z direction.

Trap Location Behind Particle

Figure 14A:
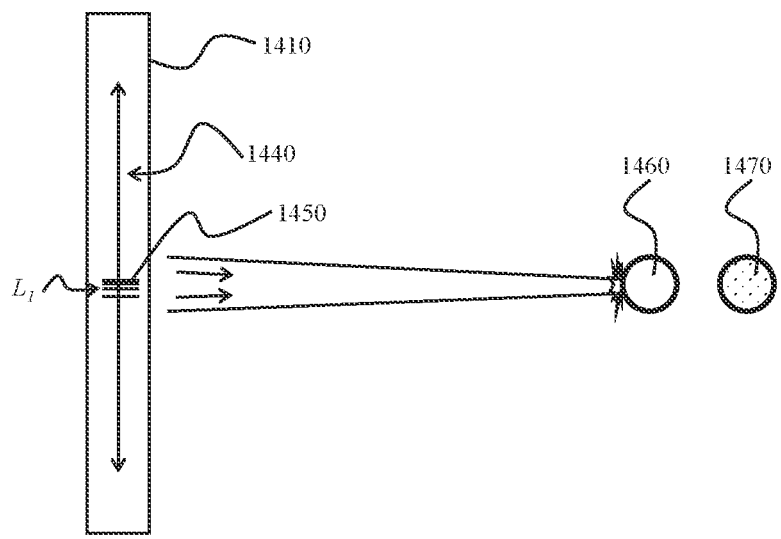
FIGS. 14a-c show an exemplary approach for generating a trap section behind a particle.
Figure 14B:
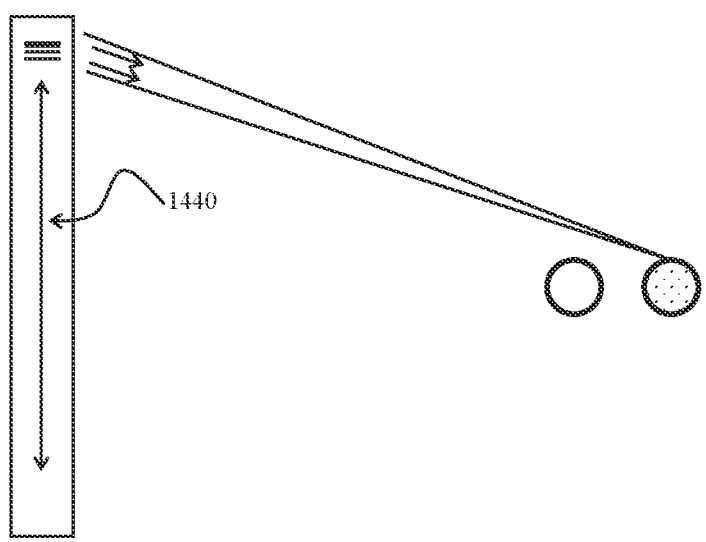
Figure 14C:
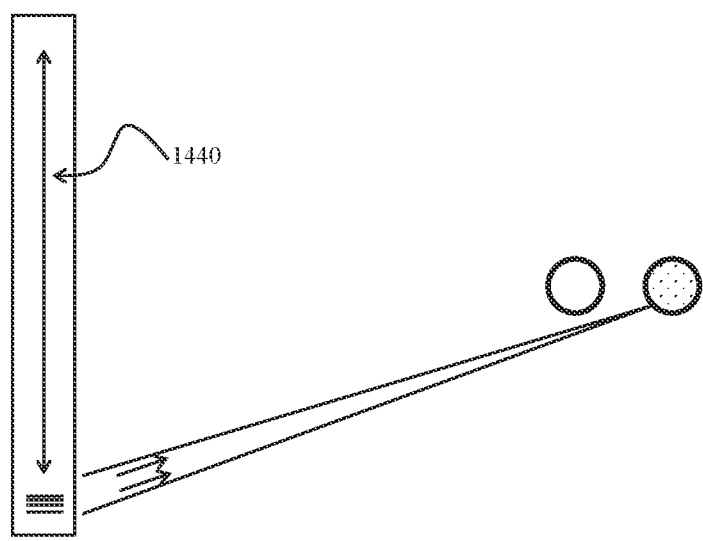

FIGS. 14a-c shows an exemplary approach for generating a trap section behind (relative to a beam source) a particle. As shown in FIGS. 14a-c, acousto-optic modulator 1410 may be a beam source, or part of the optics for a beam source, which may emit beam 1420. As is well known in the art, acoustic-optic modulator 1420 has an acoustic wave that gives rise to a diffraction grating (possible chirped for focusing) 1430 within the acoustic-optic modulator, and which cyclically undergoes spatial displacement over time along displacement pattern 1440. As shown in FIG. 14a, when grating 1450 is at location $L_1$ along displacement pattern 1440, particle 1460 blocks beam 1470 from reaching target trap section location 1480. However, when grating 1450 is at locations $L_2$ or $L_3$ along displacement pattern 1440, particle 1460 no longer blocks beam 1470 from reaching target trap section location 1480. In this manner, by taking advantage of grating movement in an acousto-optic modulator, a target trap section location that is blocked from one grating location may be reached at another location. Because grating 1450 is moving back-and-forth along displacement pattern 1440, pulsing beam 1470 at the time when grating 1450 is at either of locations $L_1$ or $L_2$ will allow beam 1470 to access target trap location 1470.

Figure 15:
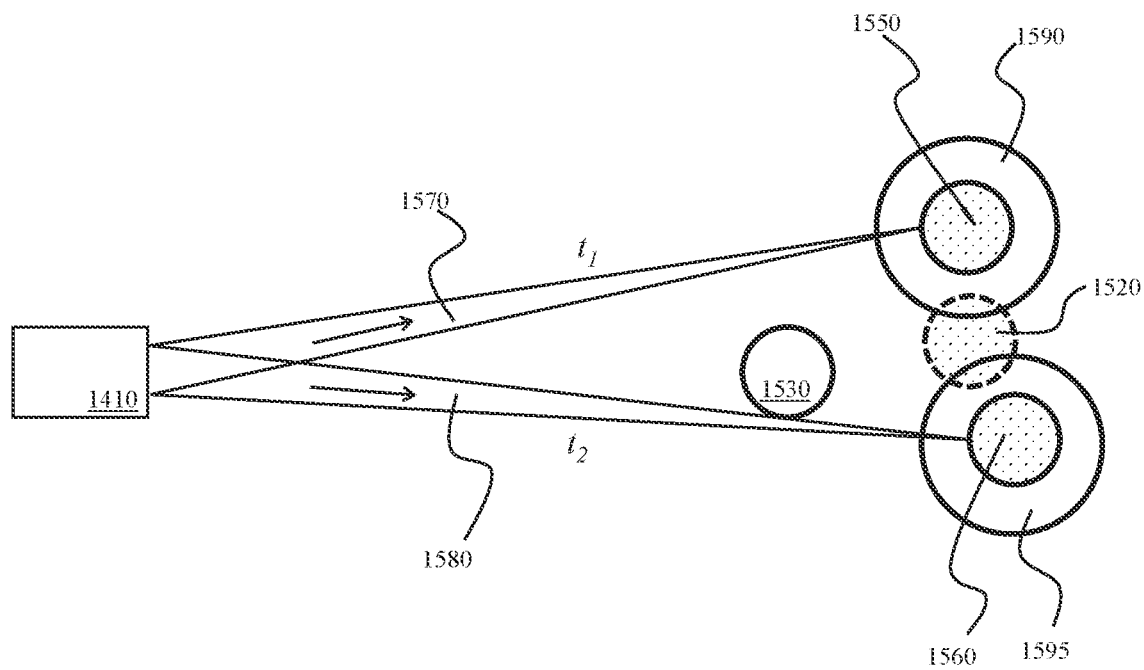
FIG. 15 illustrates an exemplary approach for generating an effective trap at locations behind a particle by relying on trapping forces.

In another embodiment, it may be possible to generate an effective trap at locations behind a particle by getting as close as possible and then relying on the trapping forces to cover for the space behind the particle. As shown in FIG. 15, beam source 1510 may be unable to emit a beam to access target trap section location 1520 because the direct path to target beam location 1520 is blocked by particle 1530. To address this issue, beam source 1510 may emit beams 1570 and 1580 to generate trap section locations 1550 and 1560, respectively, at times $t_1$ and $t_2$, respectively. Although trap section locations 1550 and 1560 are depicted in FIG. 15 as having hard boundaries, in reality the trapping effect of trap section locations 1550 and 1560 decreases as a function of the distance from the center of trap section locations 1550 and 1560. As shown in FIG. 15, trap sections 1550 and 1560 have sufficient secondary strength area to create an effective trap behind particle 1530. This approach may be applied in many other variants, e.g., with or without time multiplexing, and using different shapes and geometries.

Non-Primitive Beam Tips

In one embodiment, instead of using a finely focused beam with time multiplexing to generate a shape or trap geometry, a shaped beam with time multiplexing may be used.

FIG. 3a-3f show an example of how a ring shaped beam 310 may be used with time multiplexing to create a trapping geometry/shape. Many ways, e.g., and axicon, are known in the art to form a ring-shaped beam. At $t_1$ (FIG. 3a), beam 310 may generate a ring at location 321. At $t_2$ (FIG. 3b), beam 310 may generate a ring at location 322. At $t_3$ (FIG. 3c), beam 310 may generate a ring at location 323. At $t_4$ (FIG. 3d), beam 310 may generate a ring at location 324. At $t_5$ (FIG. 3e), beam 310 may generate a ring at location 325. The dashed rings shown FIGS. 3b-3f show the contours/boundaries of the effective/functional trap geometry generated by directing beam 310 at locations 321, 322, 323, 324, and 325 at times $t_1$, $t_2$, $t_3$, $t_4$, and $t_5$, respectively. As explained herein above, the ring location may be changed in steps (e.g., pulse illumination at location 321 at time $t_1$, then turn off beam, and then pulse illumination at location 322 at time $t_2$, etc.), or continuously (beam shape and location may be continuously altered and re-shaped to form a continuous effective/functional trap geometry), or a combination of steps and continuous.

Figure 3A:
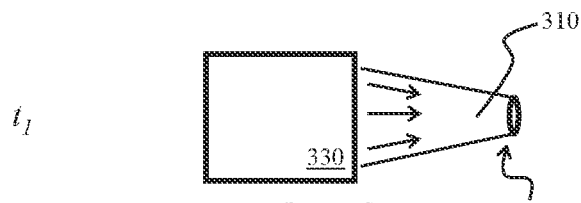
FIGS. 3a-3g show an example of how a ring-shaped beam may be used with time multiplexing to create a trapping geometry/shape.
Figure 3B:
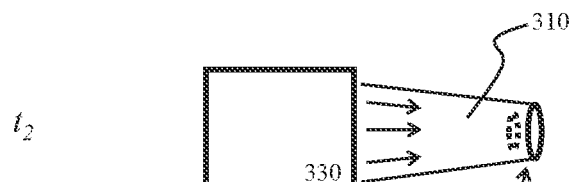
Figure 3C:
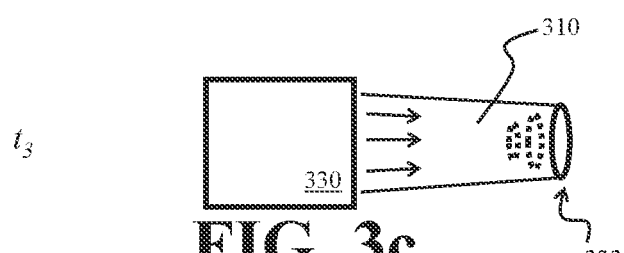
Figure 3D:
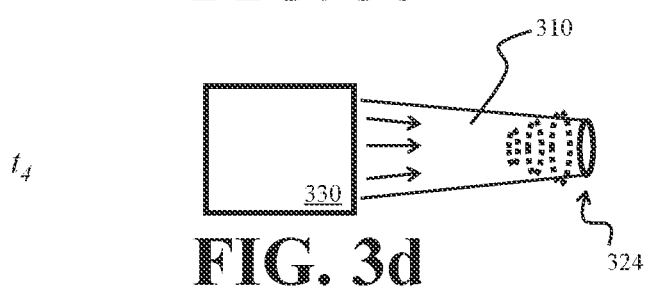
Figure 3E:
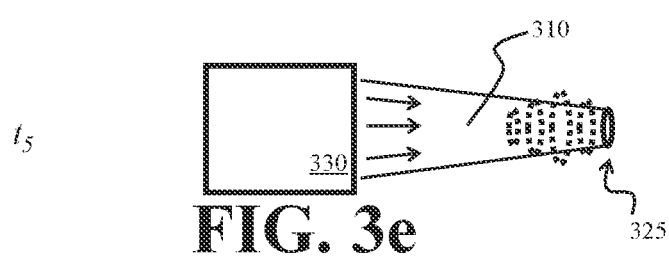
Figure 3F:
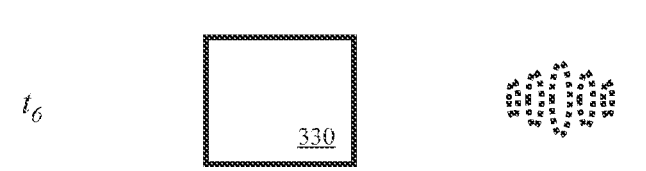
Figure 3G:
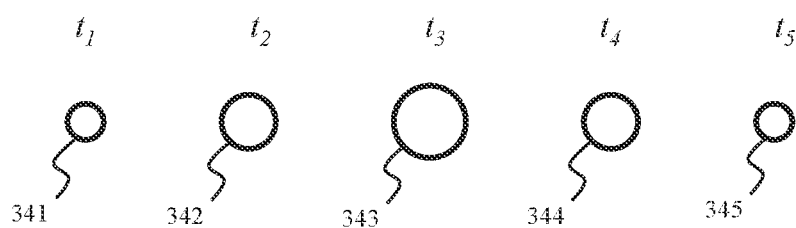

FIG. 3g shows, from the perspective of optics beam source 330, the cross-sectional shapes 341, 342, 343, 344, and 345 of beam 310 at locations 321, 322, 323, 324, and 325 and times $t_1$, $t_2$, $t_3$, $t_4$, and $t_5$, respectively.

Using time multiplexing, many different beam shapes can be combined, over time, to generate many different shapes and/or trap geometries.

In another embodiment, as shown in FIGS. 5a-c, time multiplexing may be used to generate a trap geometry that opens and closes. FIG. 5a shows a 2D trap geometry comprising multiple trap sections generated by directing a beam tip toward such location, thereby surrounding and trapping, particle 505. The trap geometry may be formed by iteratively directing a trapping beam at locations the trap section locations comprising trap 520, or by continuously scanning the trapping beam along a path that includes the trap section locations comprising trap 520. In some embodiments, a similar result may be achieved, in whole or in part, by modifying a beam over time (e.g., by moving one or more lenses in a lens system to change the imaged ring position and magnification, thereby contracting and expanding a ring shape, which may result in a cocoon-shaped trap geometry). The trap may be maintained by re-iterating through the locations/path as often as is necessary to keep prevent particle 505 from exiting the space defined by the boundaries/contours of trap 520. This is easily scaled to three dimensions, but is shown here in two dimensions for the sake of simplicity.

FIG. 5b shows how the trap geometry may be changed to "open" the trap to allow particle 505 to enter or exit trap 530. FIG. 5c shows how the trap geometry may be changed to "open" trap 540 on the side opposite the opening in FIG. 5b. Using time multiplexing, a trap may be "opened" or "closed" arbitrarily by making openings of arbitrary size or shape.

Additionally, in some embodiments, the locations of time-multiplexed beam locations may be spaced to result in a probability that a particle will enter or exit a trap, and the spacing/shaping of the time-multiplexed beam locations may be adjusted to alter the probability that a particle with enter or exit a trap.

Careful design of time-multiplexed beam location and timing may also be used to control the path of a particle, as well as the speed at which a particle traverses a particular path.

Particle Organization

Figure 4A:
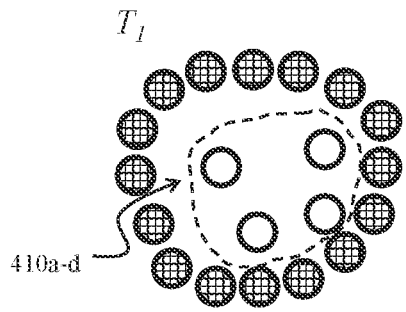
FIGS. 4a-4g show how time multiplexing may be used to group and/or organize particles.
Figure 4E:
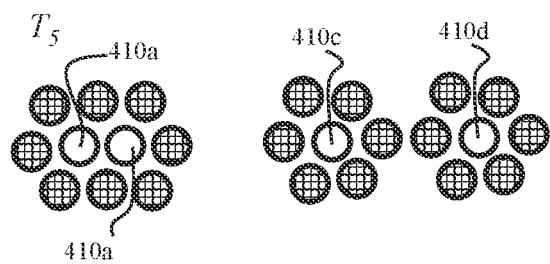
Figure 4B:
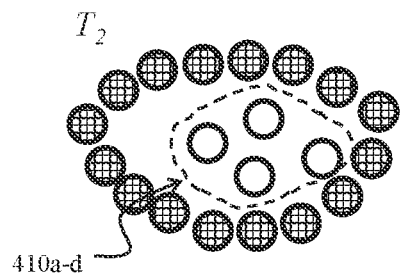
Figure 4F:
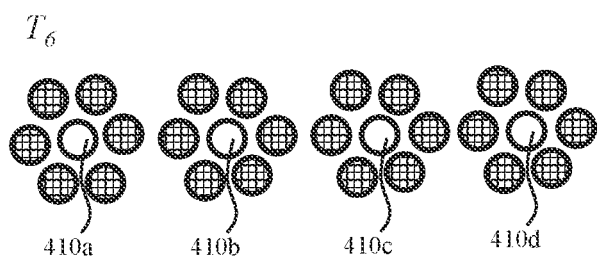
Figure 4C:
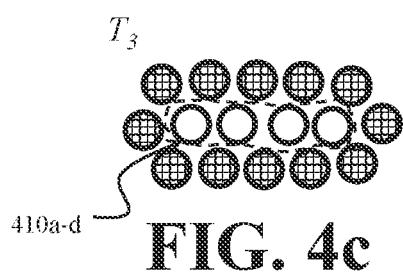
Figure 4G:
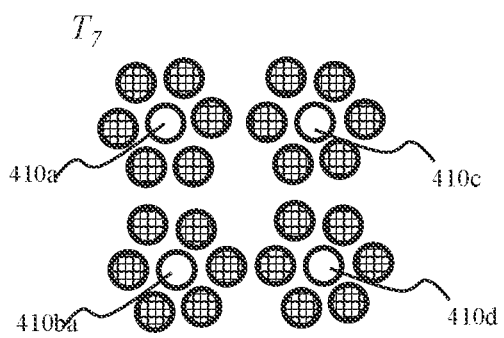
Figure 4D:
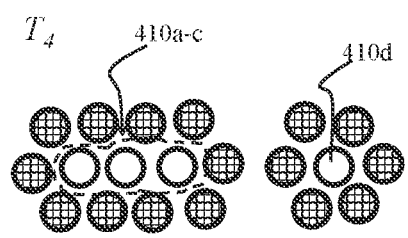

FIGS. 4a-4g illustrate how time multiplexing may be used to group and/or organize particles. FIGS. 4a-4g use upper case "T" for the times instead of lower case "t"s to indicate that using multiplexing to form, maintain, and alter the trap formations and geometries in FIGS. 4a-4g requires many iterative beam emissions (or continuous emission) at the locations and/or location patterns shown in FIGS. 4a-4g, as described herein above. As shown in FIGS. 4a-4g, time-multiplexed generation of trap geometries may be used to generate the shapes in FIGS. 4a-4g, and by so doing to organize a set of particles 410a-d. FIG. 4a shows how at time $T_1$ the locations of time-multiplex-generated trap sections (identified by cross-hatching) may be used to generate a trapping geometry to spatially group and surround particles 410a-d. FIG. 4b shows how at time $T_2$ the locations of time-multiplex-generated trap sections (identified by cross-hatching) may be used to generate a trapping geometry to begin to spatially organize particles 410a-d. FIG. 4c shows how at time $T_3$ locations of time-multiplex-generated trap sections (identified by cross-hatching) may be used to generate a trapping geometry to spatially organize particles 410a-d into a row. FIG. 4d shows how at time $T_4$ locations of time-multiplex-generated trap sections (identified by cross-hatching) may be used to generate a trapping geometry to spatially separate particles 410a-d, while still maintaining a desired spatial proximity or relationship between particles 410a-d.

FIG. 4e shows how at time $T_5$ locations of time-multiplex-generated trap sections (identified by cross-hatching) may be used to generate a trapping geometry to spatially separate particles 410a-d, while still maintaining a desired spatial proximity or relationship between particles 410a-d.

FIG. 4*f* shows how at time $T_6$ locations of time-multiplex-generated trap sections (identified by cross-hatching) may be used to generate a trapping geometry to spatially separate particles 410*a-d* from each other, while still maintaining a desired spatial proximity or relationship between particles 410*a-d*.

FIG. 4*g* shows how at time $T_7$ locations of time-multiplex-generated trap sections (identified by cross-hatching) may be used to generate a trapping geometry to spatially separate and organize particles 410*a-d* relative to each other, while still maintaining a desired spatial proximity or relationship between particles 410*a-d*.

Spatially organizing multiple particles relative to each other may have several useful applications, e.g., backup particles, occlusion (first particle may be used for reflecting light, and a second "off" particle may be used to occlude some light reflected from first particle, e.g., by eclipsing scattered light in a particular direction).

Illumination Light Regions

Figure 17A:
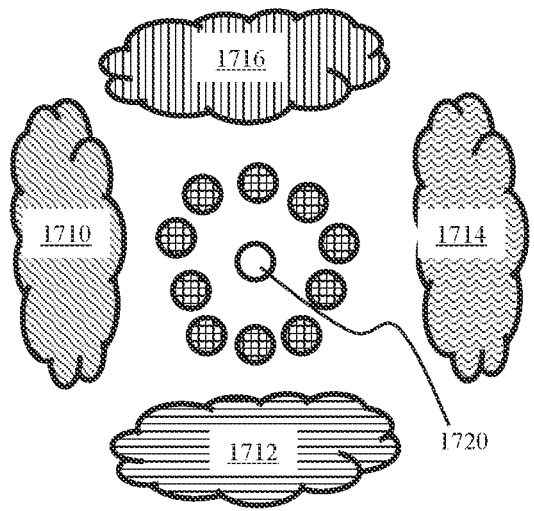
FIGS. 17a-c show how illumination light may be placed around a trapped particle.
Figure 17C:
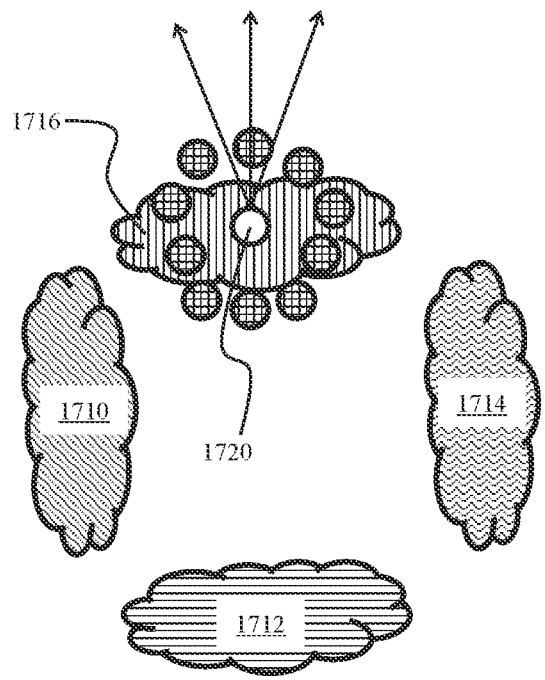
Figure 17B:
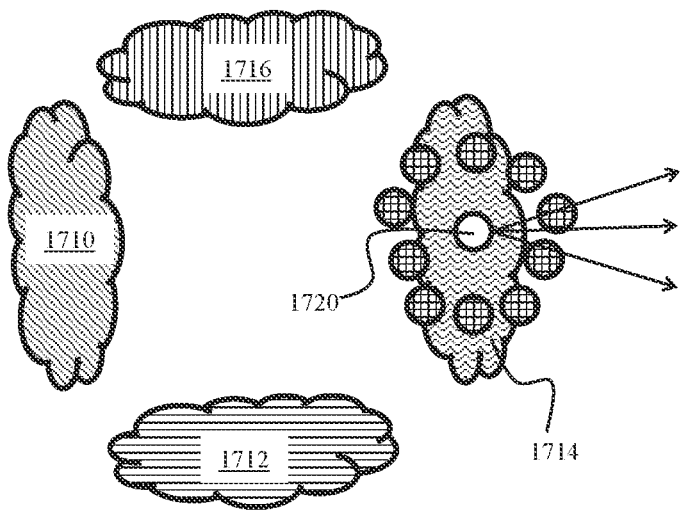

As shown in FIGS. 17*a-c*, illumination light could be placed in regions 1710, 1712, 1714, and 1716 around trapped particle 1720, instead of shining illumination directly on the particle. Each of regions 1710, 1712, 1714, and 1716 may have a different color of illumination light. For example, region 1710 may be red, region 1712 may be green, region 1714 may be blue, and region 1716 may be yellow. FIG. 17*a* shows a spatial configuration in which time-multiplexed beams at the time-multiplex-generated trap sections (identified by circles with cross hatching) are used to trap particle 1720. As shown in FIG. 17*b*, the time-multiplex-generated trap may be used to drag particle 1720 into region 1714, thereby resulting in blue illumination. As shown in FIG. 5*c*, the time-multiplex-generated trap may be used to drag particle 1720 into region 1716, thereby resulting in green illumination.

Grating for Trapping and Illumination

Figure 12A:
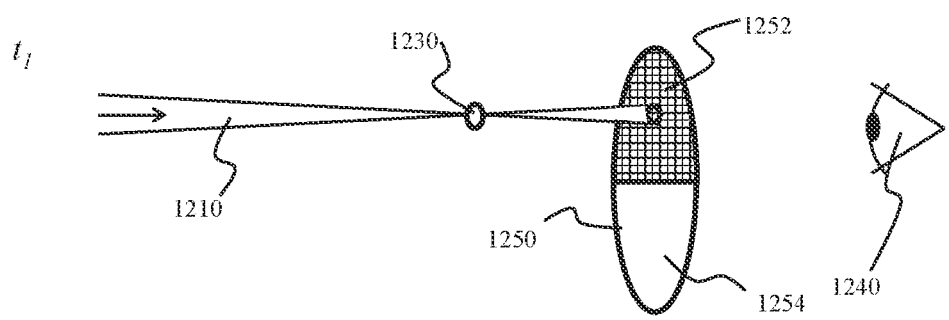
FIGS. 12a-12d show an exemplary embodiment of how grating may be used with time multiplexing to generate a trap and illumination with the same laser.
Figure 12B:
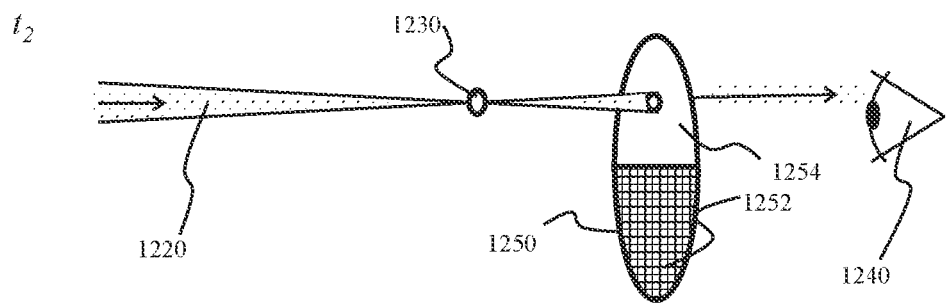
Figure 12C:
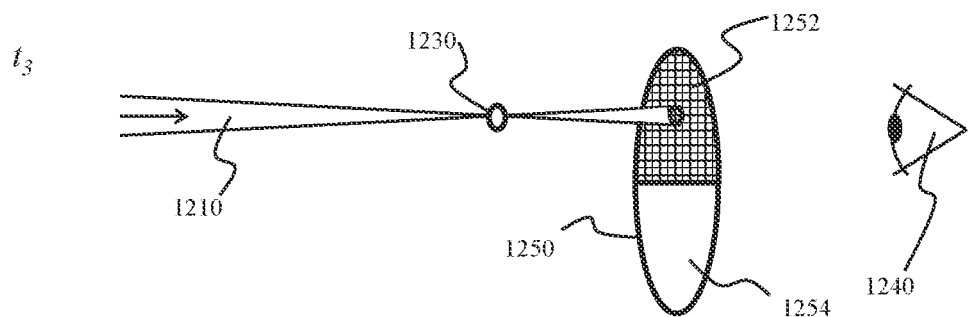
Figure 12D:
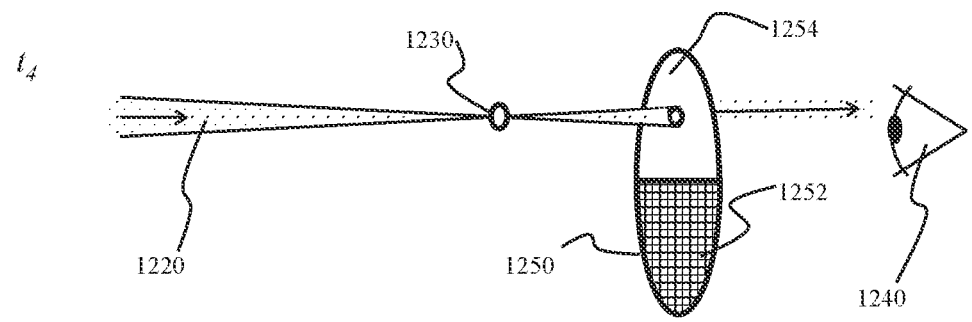

FIGS. 12*a*-12*d* show how grating may be used with time multiplexing to generate a trap and illumination with the same laser. As shown in FIG. 12*a*, trap beam 1210 may be a laser beam with sufficiently high power for trapping a particle, and at time $t_1$ grating may be used with blocking portion 1252 of shutter 1250 to block a high-power laser beam used for trapping particle from reaching eye/receiver 1240. At time $t_2$ shutter 1250 may altered to allow illumination beam light 1220 to go through (using non-blocking portion 1254 of shutter 1250), and a lower-powered laser beam 1220 may be used to illuminate particle 1230. At time $t_3$, shutter 1250 may be blocked again for use of high-powered laser beam 1210 for trapping. At time $t_4$, shutter 1250 may be altered to allow light to go through (using non-blocking portion 1254 of shutter 1250), and a lower-powered laser beam 1220 may be used to again illuminate particle 1230. Using this or a similar time-multiplexing approach, the same laser may be used for trapping and for illuminating a particle.

Using a time-multiplexing approach, any or multiple properties of a trapping beam, illumination beam, or other beam could be changed at each time multiplex interval: beam color, beam shape, beam origin, beam direction, beam path, polarization, or other beam properties known in the art.

Particle Dragging

Figure 6A:
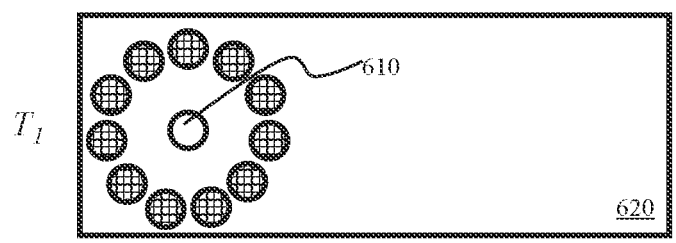
FIGS. 6a-6e show how a time-multiplex-generated trap may be used to spatially move a particle across a space.
Figure 6B:
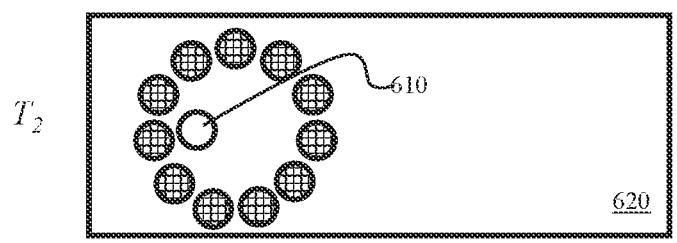
Figure 6C:
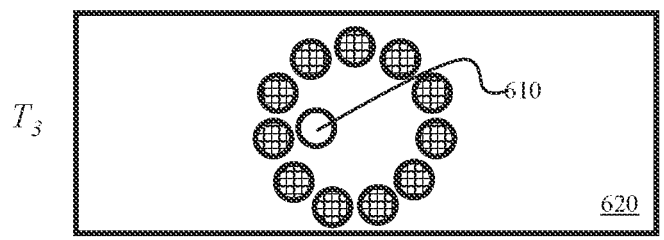
Figure 6D:
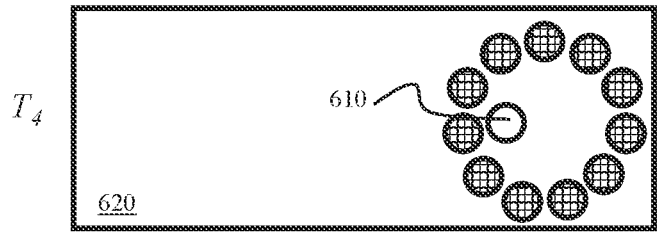
Figure 6E:
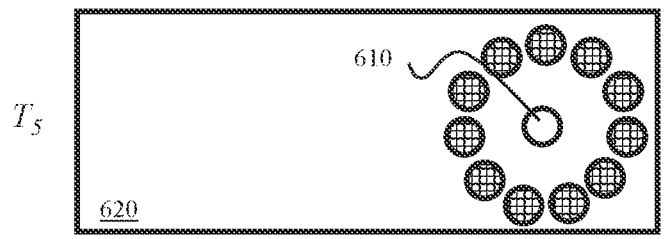

FIGS. 6*a*-6*e* show how a time-multiplex-generated trap may be used to spatially move a particle across space 620. FIG. 6*a* shows a trap comprising time-multiplex-generated trap sections (identified by circles with cross hatching), and which traps particle 610. As explained herein above, the time-multiplex-generated trap may be generated by iteratively directing a beam tip toward the locations of time-multiplex-generated trap sections to generate a functional trap at time $T_1$. In FIGS. 6*a*-6*e*, an upper-case "T" is used instead of a lower-case to signify that generating and maintaining the time-multiplex trap requires repeatedly and iteratively directly a beam tip along a spatial pattern or route. As shown in FIG. 6*b*, at time $T_2$ the trap may be moved to the right so that the right side of the trap is closer to the left side of particle 610. As shown in FIG. 6*c*, at time $T_3$ the trap may be moved to the right, dragging particle 610. As shown in FIG. 6*d*, at time $T_4$ the trap may continue moving to the right and dragging particle 610. As shown in FIG. 6*e*, at time $T_5$ the trap may cease moving to the right and particle 610 may spatially stabilize inside the trap. By moving, adjusting, and reshaping trap geometries near a particle, the particle may be moved in any direction at any speed, and with any other movement characteristics.

Trapping and Illumination

Figure 7A:
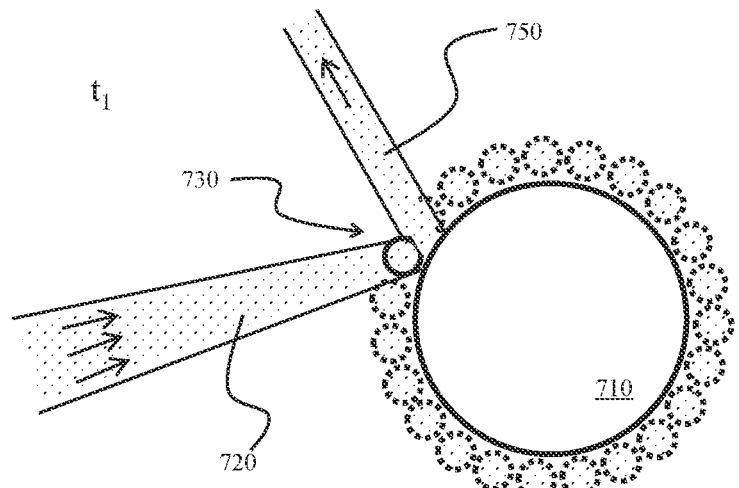
FIGS. 7a-b show an exemplary embodiment of how a beam may simultaneously perform both trapping and illumination functions.

In one embodiment, as shown in FIG. 7*a*, particle 710 is trapped at time $t_1$ in a time-multiplex-generated trap formed by time-multiplex-generated trap sections (hatching-filled circles surrounding particle 710). As indicated by the identical hatching in the trap sections in FIG. 7*a*, beam 720 may be colored and may be same color, and beam 720 may simultaneously perform trapping functions and illumination functions. In FIG. 7*a* at time $t_1$, beam 720 is directed toward location 730, thereby generating part of the trap geometry comprising locations 730. Because trapping beam 730 is also a colored beam, it interacts with and reflects off of particle 710 as reflected light 750.

Figure 7B:
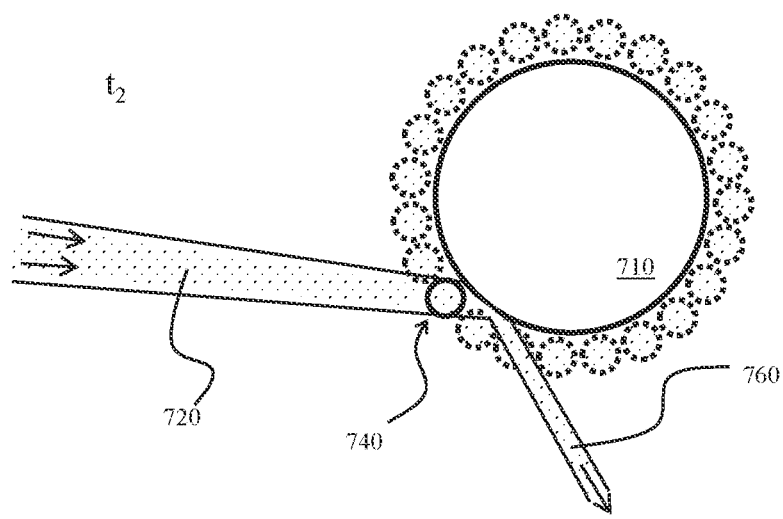

As shown in FIG. 7*b*, at time $t_2$, beam may be colored and may be directed at location 740 to generate part of trap geometry comprising location 740. Because beam 720 is colored, in addition to generating part of trap geometry 740, it also interacts with and reflects off of particle 710 as reflected light 760.

As shown in FIGS. 7*a* and 7*b*, beam 720 may be directed at any location in the multiplex-generated trap and, if colored, may simultaneously generate a part of trap geometry and illuminate the particle by interacting with and reflecting off of the particle.

Figure 8A:
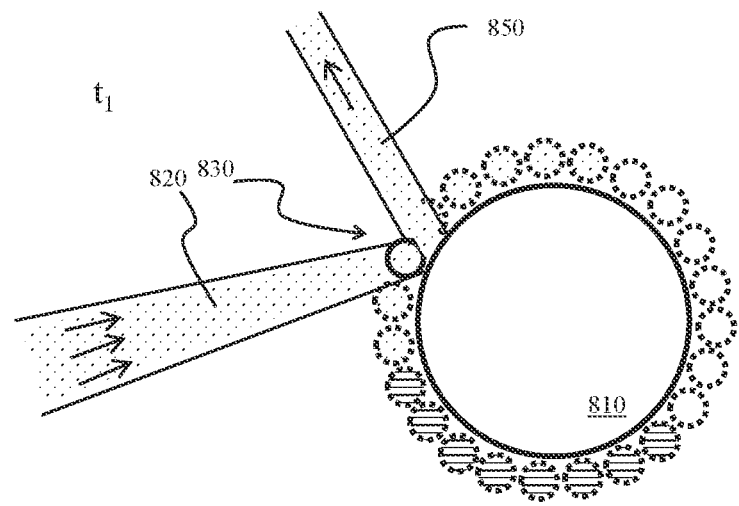
FIGS. 8a-b show an exemplary embodiment of how a beam used for both trapping and illuminating may result in reflection of different colors of light in different angles.
Figure 8B:
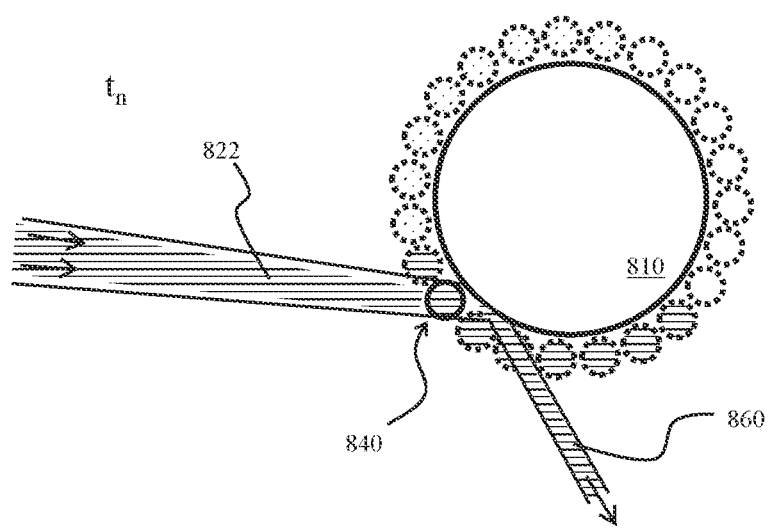

As shown in FIGS. 8*a* and 8*b*, by using the same beam for both trapping and illuminating, a particle may reflect different colors of light in different angles, thereby creating a visual effect similar to something with two different colored sides, or occlusion or partial occlusion.

FIG. 8*a* shows a time-multiplex-generated trap formed by time-multiplex-generated trap sections (hatching-filled circles surrounding particle 710), comprising trap geometry sections for which the trap is generated using a red first-colored beam, e.g., red; trap geometry locations for which the trap is generated using a second-colored beam (different from the color of the first beam); and trap geometry locations for which the trap is generated using a non-visible beam. As shown in FIG. 8*a*, at time $t_1$ beam 820 is directed at location 830 and thereby generates the trap section at location 830, but simultaneously interacts with and reflects off of particle 810 as reflected light 850, thereby directing red light in the direction of reflected light 850.

FIG. 8*b* shows that at subsequent time $t_n$, when beam 822 is directed at location 840 to generate the part of the trap at location 840, beam 822 simultaneously interacts with and reflects off of particle 810 as reflected light 860, thereby directing green light in the direction of reflected light 860.

Because it is possible to iterate through (or continuously follow the path of) all the locations in a trap geometry faster than a human's temporal vision resolution, it is possible to create an effect by which a viewer sees different colors from the same particle when the same particle is viewed from different angles. By using non-visible light, a particle may appear to be invisible when viewed from a particular angle or set of angles.

Trapping and Illuminating Separately

Although using a colored beam to simultaneously trap and illuminate may improve efficiency, it is also to possible to accomplish a similar effect by time multiplexing so that some time slots are used for trapping and other time slots are used for illumination.

Figure 9A:
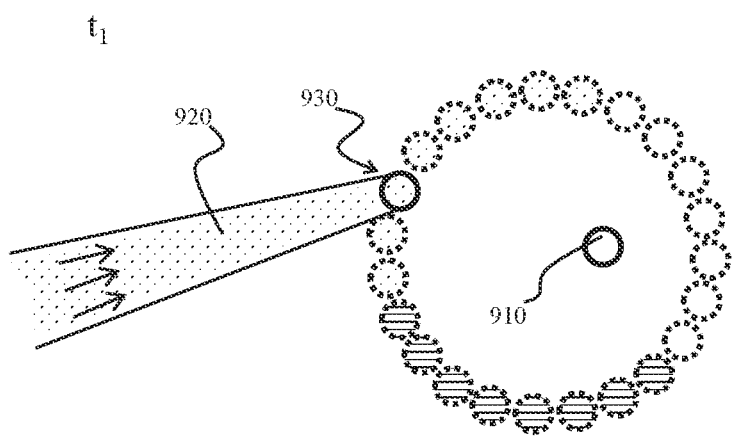
FIGS. 9a-c show an exemplary embodiment similar to FIGS. 9a-c, except that in FIGS. 9a-c the particle is much smaller relative to the space inside the multiplex-generated trap geometry.
Figure 9B:
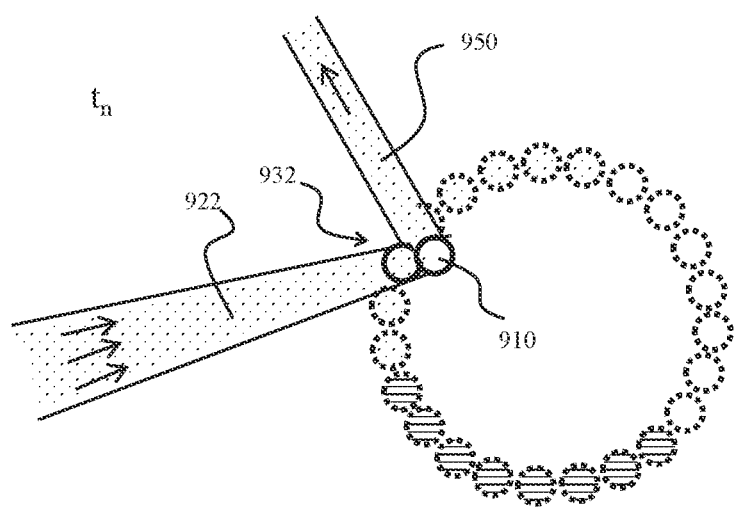
Figure 9C:
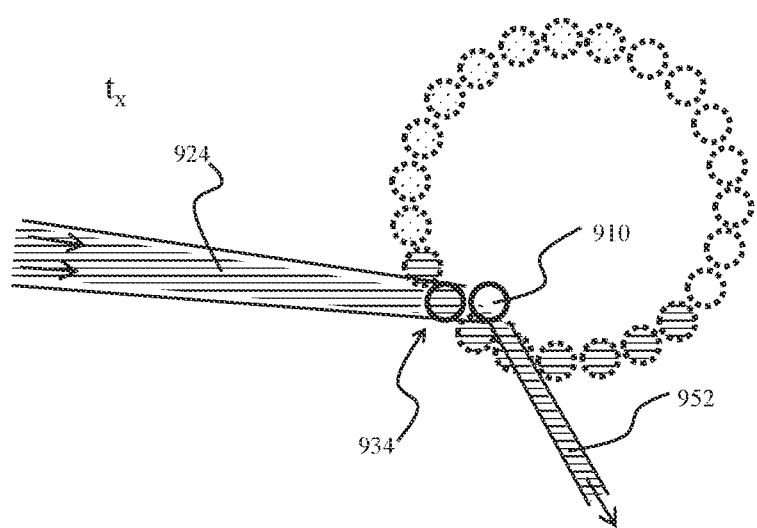

FIGS. 9a-9c shows an approach similar to the approach described in FIGS. 8a and 8b, except that particle 910 in FIGS. 9a-9c is much smaller relative to the space inside the trap. In this embodiment, particle 910 may bounce move/ tumble within the space inside the multiplex-generated trap geometry (circles surrounding particle 910), bouncing off the inside walls of the trap geometry. When particle 910 is far from the trap boundaries, as shown in FIG. 9a, no light from beam 924 (trap/illumination beam) reflects off particle 924 and particle 924 is not illuminated. When particle 924 is near part of the trap boundary, e.g., at location 932 as shown in FIG. 9b, if colored beam 922 is directed toward location 932, then colored beam 922 also interacts with and reflects off of particle 910 as reflected light 950. When particle 910 is near part of the trap boundary, e.g., at location 934 as shown in FIG. 9c, if colored beam 924 is directed toward location 934 then colored beam 924 also interacts with and reflects off of particle 910 as reflected light 952. In this manner, by using different colors of light in a time multiplexing scheme to generate selected trap locations, a particle bounding/tumbling within the trap with regularly be sufficiently near a trap boundary location at the same time light is being directed toward the trap boundary location, and the particle will thereby interact with and reflect the light from the beam. Assuming the particle travels in the vicinity of different-colored regions of the trap boundary sufficiently frequently, and further assuming that the beam illuminates trap locations sufficiently frequently, an multi-angle effect similar to the effect in FIGS. 8a and 8b results.

Again, although using a colored beam to simultaneously trap and illuminate may improve efficiency, it is also to accomplish a similar effect by time multiplexing so that some time slots are used for trapping and other time slots are used for illumination.

Spatial Illumination/Filtering

Figure 13A:
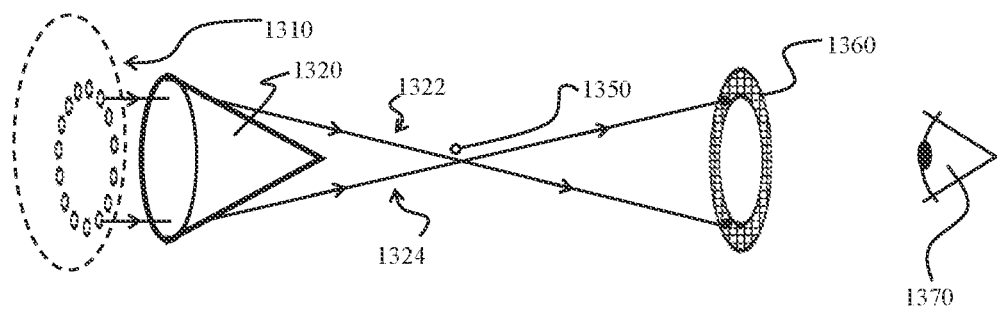
FIGS. 13a-c show an exemplary embodiment of how a spatial filter may be used to filter potentially dangerous or otherwise undesirable high-power beams from reaching a detector or viewer.

FIG. 13a shows how a spatial filter may be used to filter potentially dangerous or otherwise undesirable high-power beams (or beams with other characteristics) from reaching a detector or viewer.

As shown in FIG. 13a. One or more beam sources 1310 may emit a beam toward optical device 1320, which in this case is an axicon. Although a beam 1322 may be directed toward particle 1350, some or all of beam 1322 may miss or otherwise not interact with or be deflected or diffused by particle 1350 and may therefore continue past particle 1350 toward viewer/detector 1370. Because light 1322 has not been diffused/diffracted by particle 1350 such light may be too powerful for interaction for viewer/detector 1370 (possibly dangerous to a human eye). By using ring spatial filter designed for axicon 1320, all light that has not been diffused/ diffracted by particle 1350 may be blocked from viewer/ detector 1370. For example, light source 1310 may be an LED and may emit beam 1322 toward axicon 1320, and beam 1322 may emerge from axicon as redirected beam 1322. Redirected beam 1322 may slightly miss, in whole or in part, particle 1350, and may therefore continue toward spatial filter 1360, where redirected beam 1322 is blocked. Beam 1324 may behave similarly.

Figure 13B:
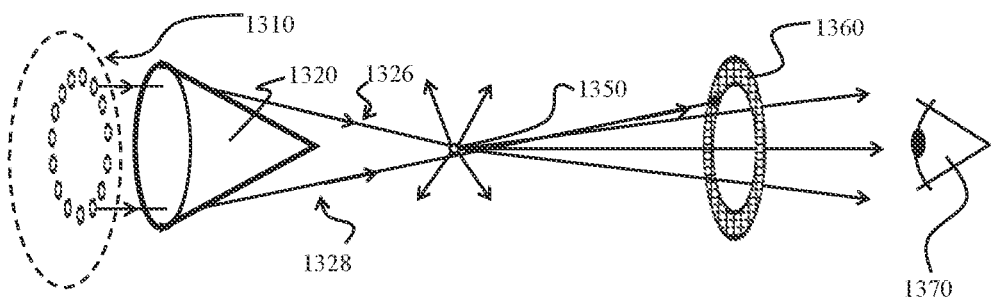

As shown in FIG. 13b, when a particle is sufficiently small, an electromagnetic beam's interaction with particle 1350 may interact result in a multi-directional diffusion of the beam. For example, as shown in FIG. 13b, light source 1310 may be an LED and may emit beam 1326 toward axicon 1329, and beam 1326 may emerge from axicon as redirected beam 1326. Redirected beam 1326 may be directed toward and may interact with particle 1350 thereby resulted in multi-directional diffracted light/radiation, some of which may be directed toward viewer/detector 1370. Beam 1328 may miss particle 1350 and behave like beams 1324 and 1322.

Figure 13C:
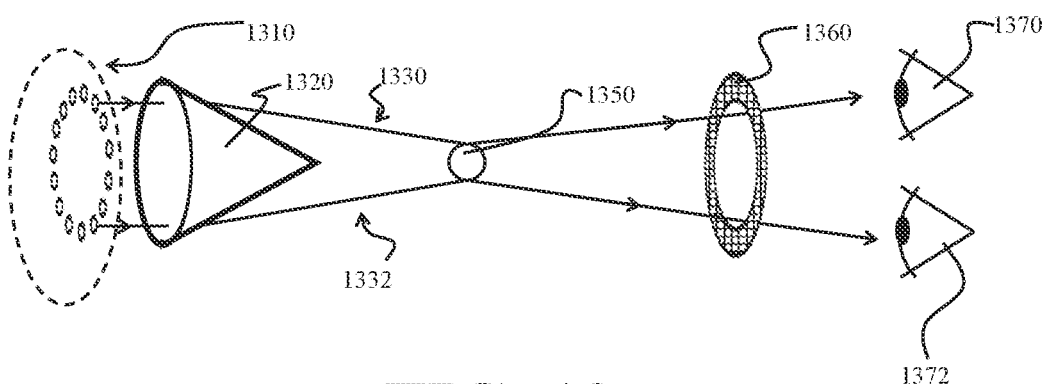

In some embodiments, as shown in FIG. 13c, if particle 1350 is sufficiently large and/or has an amenable geometry (e.g., flat, angled sides), instead of diffusing beam light in multiple directions, the particle reflect light in one direction or in an narrow set of angular directions, e.g., similar to a laser on a mirror or planar surface. In this case, the angle of reflection may be selected based on the direction from which a beam interacts with the particle. As shown in FIG. 13c, by selecting the direction of a beam that interacts with particle 1350, the direction of the reflected light may be controlled, thereby making the reflected light visible in only one direction or set of directions. As shown in FIG. 13c, by originating beam 1330 from beam source 1310, and using axicon 1320, beam 1330 emerges from axicon 1320 as redirected beam 1330, which interacts with particle 1350, resulting in reflected beam 1350, which is perceived by viewer/detector 1370 but not by viewer/detector 1372. By originating beam 1332 from beam source 1310b, and using axicon 1320, beam 1332 emerges from axicon 1320 as redirected beam 1332, which interacts with particle 1350, resulting in reflected beam 1332, which is perceived by viewer/detector 1372 but not by viewer/detector 1370. This approach may be used in conjunction with the time multiplexing scheme[s] disclosed herein, e.g., by emitting beams from beam sources 1330 and 1332 at different times, or by using the same beam source, emitting from different locations at different times, or by time multiplexing so that a beam source is not always emitting, but is emitting with sufficient frequency for perception by the human eye or other detector device.

Arbitrary Location for Trapping Beam Source

It may be desirable to for the trapping beam source to be directed away from a human eye, viewer, or detector. This may be desirable to protect a human eye or other detector form the potentially high power of a trapping beam. Flexibility on beam source location may be desirable for many other reasons, e.g., convenience, spatial restrictions, etc.

Figure 16A:
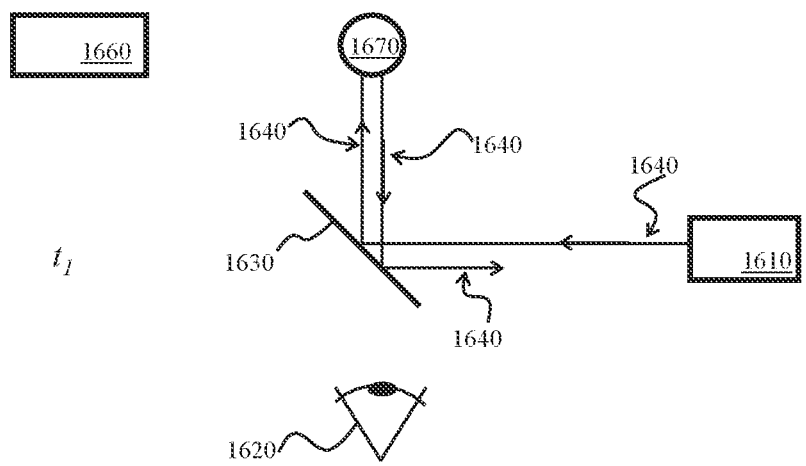
FIGS. 16a-b illustrate an exemplary approach for directing a trapping beam away from a human eye or detector, or for placing the beam source in an arbitrary location.
Figure 16B:
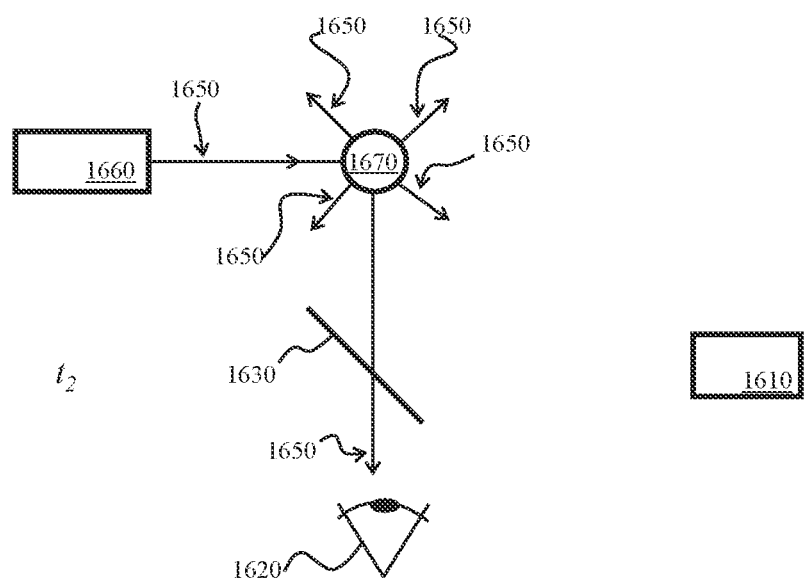

For example, as shown in FIGS. 16a and 16b, trapping beam source 1610 may have an arbitrary location relative to viewer/detector 1620. Dichroic mirror 1630 may be configured to reflect trapping beam, but to allow illumination beam 1650 to pass. Because mirror 1630 is dichroic, trapping beam source 1610 and illumination beam source 1660 may emit trapping beam 1640 and illumination beam 1660 simultaneously. For the sake of simplicity, FIGS. 16a and 16b show trapping beam 1640 and illumination beam 1650 separately. The two beams could also be time multiplexed. As shown in FIG. 16a, because mirror 1630 reflects trapping beam 1640, no reflection from beam 1640 after interaction with particle 1670 will reach viewer/detector 1620, but will instead be reflected by mirror 1630 away from viewer/ detector 1620. Using this approach, beam source 1610 may be located in almost any location, and reflection angle of mirror 1630 may be adjusted accordingly, as long as mirror 1630 reflects beam 1640 toward particle 1670 and is between particle 1670 and viewer/detector 16b.

As shown in FIG. 16b, because mirror 1630 allows illumination beam 1650 from illumination beam source 1660 to pass, light 1650 from illumination beam source 1660 reaches viewer/detector 1620.

In another embodiment, mirror 1630 may be a mirror that is switchable between a half-mirror (half silvered) and a full mirror (full-silvered). This embodiment requires time multiplexing. At time $t_1$, as shown in FIG. 16a mirror 1630 may be in a full-mirror state, trapping beam source 1610 may emit trapping beam 1640, mirror 1630 may thereby reflect trapping beam 1640 away from viewer/detector 1620. At time $t_2$, as shown in FIG. 16b, mirror 1630 may be in a half-silvered state, illumination source 1660 may emit illumination beam 1650, and mirror 1630 may allow part of light 1650 from illumination beam 1650 to pass to viewer/detector 1620.

Many other configurations using mirrors for arbitrary placement of a trapping beam source, illumination beam source, and/or any other beam source may be designed for specific applications.

Although electromagnetic radiation is often referred to as "light" or "optic beam" or using other terminology that may suggest visibility of electromagnetic radiation, the invention and disclosure herein are not limited to visible radiation but applicable to all types of electromagnetic radiation, regardless of visibility, except where explicitly disclosed otherwise or where an applications or conditions would necessarily limit the spectrum of electromagnetic radiation, e.g., where it is intended for a human viewer to perceive electromagnetic radiation with her or her eye.

Although many of the figures and associated description herein illustrate two dimensions, or applications/implementations in two dimensions, the disclosure and invention herein applies similarly in three dimension. Two-dimensional figures, cross sections, and descriptions are used merely for the sake of clarity and simplicity.

What is claimed is:

1. A method for manipulating a particle, comprising:
   directing a time-multiplexed electromagnetic beam at a location that will result in interaction between the time-multiplexed electromagnetic beam and the particle;
   wherein:
     the time multiplexing comprises, over a time segment, directing the electromagnetic beam at at least two different locations;
     directing the electromagnetic beam at at least two different locations comprises generating a geometry;
     the geometry comprises a trapping geometry configured to fully or partially trap the particle; and
     at least one from the following list:
       the geometry comprises a trapping geometry configured to fully trap the particle, and further comprising dragging the particle by using the electromagnetic beam to subsequently generate a second trapping geometry configured to fully trap the particle, wherein the second trapping geometry is different from the trapping geometry in at least shape and location; and
       at a first time the trapping geometry comprises a partial trap with a first opening having a size, shape, and orientation: at a second time the trapping geometry comprises a partial trip with a second opening having a size, shape, and orientation; and the first opening differs from the second opening in at least one of the following features: size, shape, and orientation.

2. The method of claim 1, wherein the geometry comprises a trapping geometry configured to fully trap the particle, and further comprising dragging the particle by using the electromagnetic beam to subsequently generate a second trapping geometry configured to fully trap the particle, wherein the second trapping geometry is different from the trapping geometry in at least shape and location.

3. The method of claim 1, wherein:
   at a first time the trapping geometry comprises a partial trap with a first opening having a size, shape, and orientation;
   at a second time the trapping geometry comprises a partial trip with a second opening having a size, shape, and orientation; and
   the first opening differs from the second opening in at least one of the following features: size, shape, and orientation.

4. A method for manipulating a particle, comprising:
   directing a time-multiplexed electromagnetic beam at a location that will result in interaction between the time-multiplexed electromagnetic beam and the particle;
   wherein:
     the time multiplexing comprises, over a time segment, directing the electromagnetic beam at at least two different locations;
     directing the electromagnetic beam at at least two different locations comprises generating a geometry:
   the geometry comprises a trapping geometry configured to fully or partially trap the particle;
   at a first time the trapping geometry comprises a partial trap having at least a first opening; and
   at a second time the trapping geometry comprises a substantially closed trap.

5. A method for manipulating a particle, comprising:
   directing a time-multiplexed electromagnetic beam at a location that will result in interaction between the time-multiplexed electromagnetic beam and the particle; and
   at least one from the following list:
     using a ring spatial filter to protect a viewer from the electromagnetic beam;
     time multiplexing a mirror in silvered and half-silvered states to reflect trapping light from the electromagnetic beam when the electromagnetic beam is in an on-state, and to allow to pass illumination light when the electromagnetic beam is in an off-state; and
     using an acousto-optic modulator that generates a diffraction grating that undergoes spatial displacement to allow the electromagnetic beam to be directed, from a second source location, toward a target location that is behind the particle relative to a first source location that is different from the second source location.

6. The method of claim 5, comprising using an acousto-optic modulator that generates a diffraction grating that undergoes spatial displacement to allow the electromagnetic beam to be directed, from a second source location, toward a target location that is behind the particle relative to a first source location that is different from the second source location.

7. The method of claim 5, comprising using a ring spatial filter to protect a viewer from the electromagnetic beam.

8. The method of claim 5, further comprising time multiplexing a mirror in silvered and half-silvered states to reflect trapping light from the electromagnetic beam when the electromagnetic beam is in an on-state, and to allow to pass illumination light when the electromagnetic beam is in an off-state.

* * * * *